United States Patent
Beyginian et al.

(10) Patent No.: US 9,640,953 B2
(45) Date of Patent: May 2, 2017

(54) SWITCHGEAR MOTOR OPERATOR

(71) Applicant: S&C Electric Company, Chicago, IL (US)

(72) Inventors: Albert Beyginian, Aurora (CA); Michael Chisholm, Guelph (CA); Terry Kerr, Guelph (CA)

(73) Assignee: S&C ELECTRIC COMPANY, Chicago, IL (US)

( * ) Notice: Subject to any disclaimer, the term of this patent is extended or adjusted under 35 U.S.C. 154(b) by 0 days.

(21) Appl. No.: 14/683,249

(22) Filed: Apr. 10, 2015

(65) Prior Publication Data
US 2015/0213979 A1  Jul. 30, 2015

Related U.S. Application Data

(60) Provisional application No. 61/978,505, filed on Apr. 11, 2014.

(51) Int. Cl.
*H02B 11/127* (2006.01)
*H01H 33/36* (2006.01)

(52) U.S. Cl.
CPC .......... *H02B 11/127* (2013.01); *H01H 33/36* (2013.01)

(58) Field of Classification Search
CPC .................................................. H02B 11/127
See application file for complete search history.

(56) References Cited

U.S. PATENT DOCUMENTS

| 5,477,017 A | 12/1995 | Swindler et al. |
| 6,951,990 B1 | 10/2005 | Miller |
| 8,156,639 B1 | 4/2012 | Ledbetter et al. |
| 2011/0062002 A1 | 3/2011 | Hawkins et al. |
| 2012/0055765 A1 | 3/2012 | Zylstra et al. |
| 2012/0085628 A1* | 4/2012 | Pearce ................. H02B 11/127 200/50.24 |

OTHER PUBLICATIONS

United States International Searching Authority, International Search Report and Written Opinion for International Application No. PCT/US2015/025307 mailed Jul. 9, 2015.
The International Bureau of WIPO, International Preliminary Report on Patentability for International Application No. PCT/US2015/025307 mailed Oct. 20, 2016.

* cited by examiner

*Primary Examiner* — Mohamad Musleh
(74) *Attorney, Agent, or Firm* — Lorenz & Kopf, LLP

(57) ABSTRACT

A motor operator assembly is described, which is releasably secured and selectively coupled to a switchgear unit. The motor operator assembly includes a support plate, and a latch mechanism secured to the support plate that has a latch member configured to releasably secure the support plate to the switchgear unit. A guide tube is secured to the support plate and includes a cylinder assembly having a motor mount and an indexing mechanism for selectively positioning the cylinder assembly between a stowed position and a use position. A motor operator is attached to the motor mount and has a socket configured to engage an input drive shaft on the switchgear unit.

20 Claims, 9 Drawing Sheets

SWITCHGEAR MOTOR OPERATOR

CROSS-REFERENCE TO RELATED APPLICATIONS

This application claims the benefit of U.S. Provisional Application No. 61/978,505 filed on Apr. 11, 2014, the entire disclosure of which is incorporated herein by reference.

TECHNICAL FIELD

The present invention generally relates to a motorized operator for a switchgear unit in a power distribution system, and more particularly relates to a quick coupling mechanism for releasably securing and selectively coupling a motor operator to a switchgear unit.

BACKGROUND

This section provides background information related to the present disclosure, which is not necessarily prior art.

Portable motor operators are generally known in the art for providing motorized operation of the switches in a switchgear unit. Conventional motor operators have a housing, an electric motor enclosed within the housing, and a socket drive extending from the housing for engaging the input drive shaft of a switchgear unit. The motor housing may have certain alignment features, which cooperate with the switchgear housing for locating the motor operator in a use position.

Once motor operation is complete, the motor operator must be removed from the switchgear unit and stow it elsewhere. Due to the confined space in and around the switchgear unit, it is of often necessary to remove the motor operator from the site of the switchgear unit. This can be a burdensome task and may result in the misplacement or loss of the motor operator. Accordingly, it is desirable to have a motor operator, which can be releasably secured to the switchgear unit and selectively positionable from a stowed position to a use position.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

In accordance with the present disclosure, a motor operator and coupling mechanism is provided, which can be releasably secured to a switchgear unit and selectively positionable from a stowed position to a use position.

In one embodiment, a motor operator is described, which is releasably securable and selectively coupleable to a switchgear unit. The motor operator includes a support plate, and a latch mechanism which secured to the support plate and has a latch member configured to releasably secure the support plate to the switchgear unit. A guide tube is secured to the support plate and includes a cylinder assembly having a motor mount and an indexing mechanism for selectively positioning the cylinder assembly between a stowed position and a use position. A motor operator is attached to the motor mount and has a socket configured to engage an input drive shaft on the switchgear unit.

In another embodiment, a coupling mechanism is described for releasably securing and selectively coupling a motor operator to a switchgear unit. The coupling mechanism includes a support plate, and a latch mechanism secured to the support plate that has a latch member configured to releasably secure the support plate to a switchgear unit. A guide tube is secured to the support plate and includes a cylinder assembly configured to support a motor operator and an indexing mechanism to selectively position the cylinder assembly between a stowed position and a use position.

Example embodiments will now be described more fully with reference to the accompanying drawings. There is no intention to be limited by any principle presented in the preceding background or the following detailed description.

Figure 1:
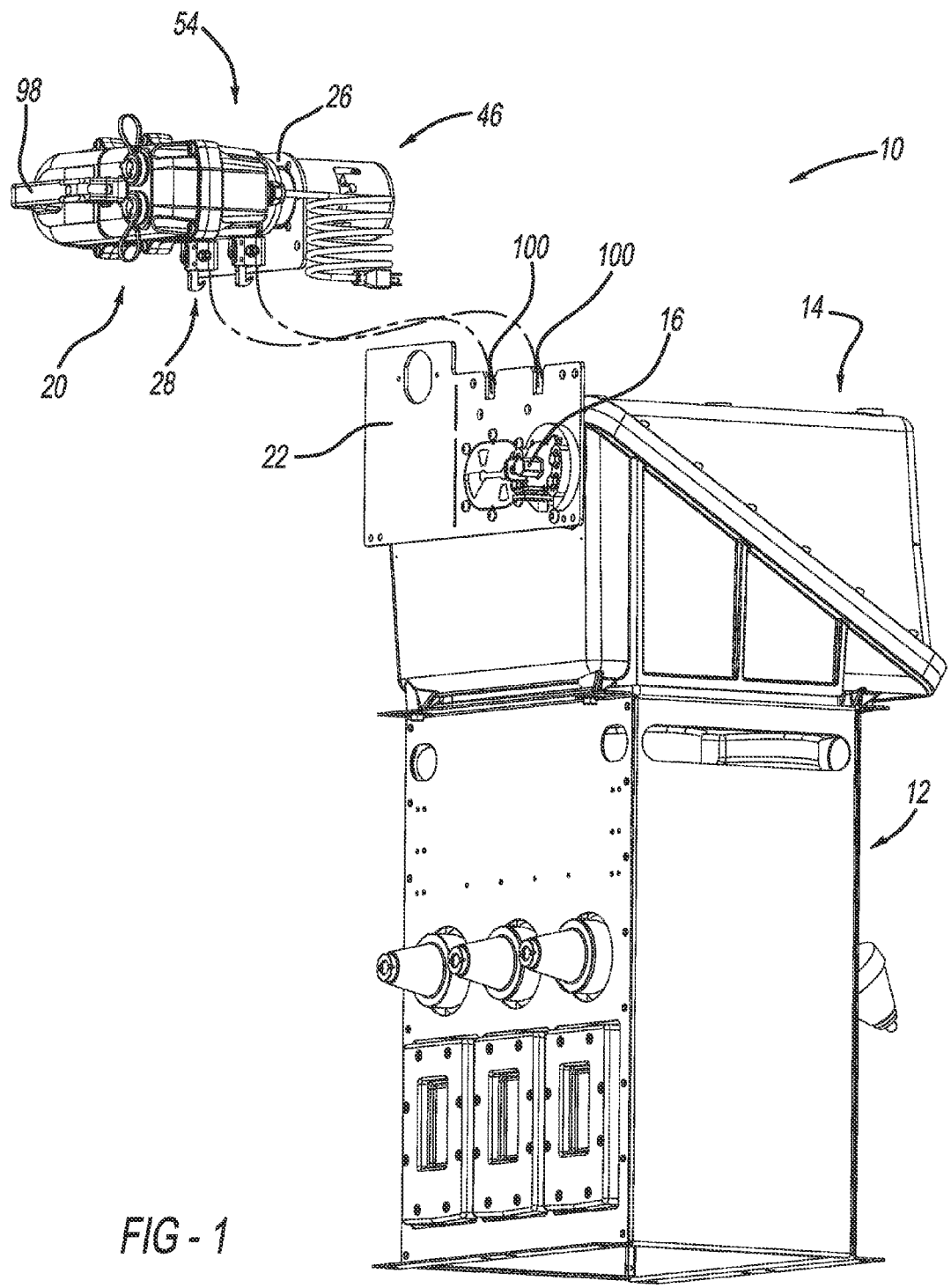
FIG. 1 is a perspective view of a switchgear unit with a motor operator having a quick coupling mechanism in an uncoupled position.

FIG. 1 illustrates a multi-phase, (e.g., three-phase) interrupting device or switchgear unit 10 that incorporates a pole unit for each phase. Each pole unit 12 includes a pair of switches such as a vacuum interrupter in series with a isolating disconnect. As illustrated in FIG. 1, the switchgear unit 10 is a three-phase combination of integral vacuum interrupters for fault or load current making and breaking, in combination with series isolating disconnects to provide a visible close or open gap in the primary circuit. Circuit breaking occurs via high-speed opening of the vacuum interrupter followed by opening of the isolating disconnect. Circuit making occurs via closing of the isolating disconnect followed by high-speed closing of the vacuum interrupter.

A switchgear operating mechanism 14 functions to open, close and reclose the vacuum interrupter and the isolating disconnect. The switchgear operating mechanism 14 includes an input drive shaft 16 extending from the switchgear operating mechanism 14. Rotation of the input drive shaft 16 in a first direction affects circuit breaking, while rotation of the input drive shaft 16 in a second direction (i.e., counter-rotation) affects circuit making. Further details concerning the pole unit 12 and the switchgear operating mechanism 14, including their components and operation are described in the following US applications filed by Applicant: U.S. Provisional Application No. 61/978,378 filed on Apr. 11, 2014 entitled *Circuit interrupters with Masses in Contact Spring Assemblies*; U.S. Provisional Application No 61/978,520, filed on Apr. 11, 2014 and entitled *Switchgear Operating Mechanism*; and U.S. Provisional Application No. 61/978,371 filed on Apr. 11, 2014 entitled *Circuit Interrupters with Air Trap Regions in Fluid Reservoirs*, the disclosures of which are expressly incorporated by reference herein.

Figure 2:
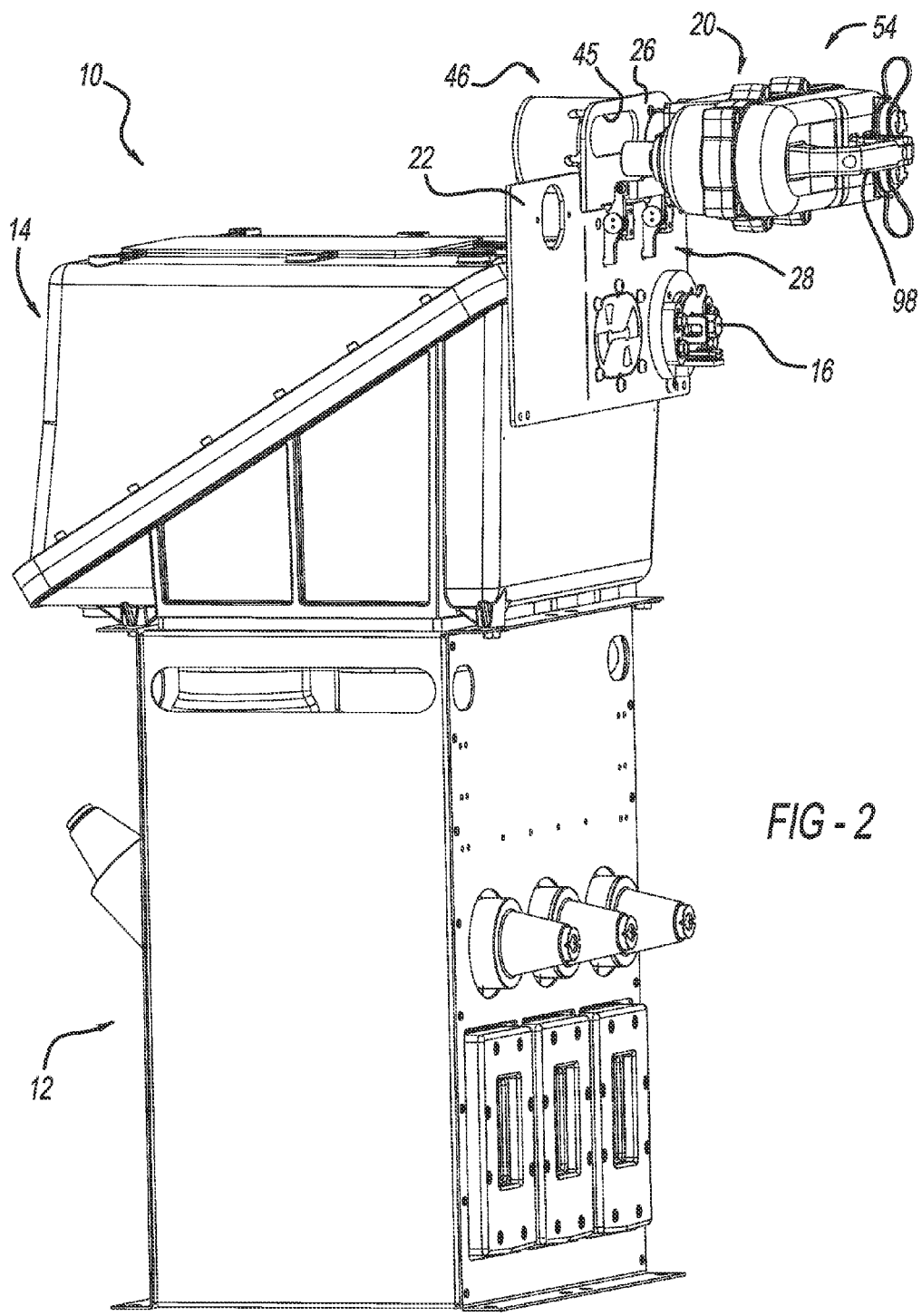
FIG. 2 is a perspective view of a switchgear unit with the motor operator coupled to the switchgear operating mechanism.
Figure 4:
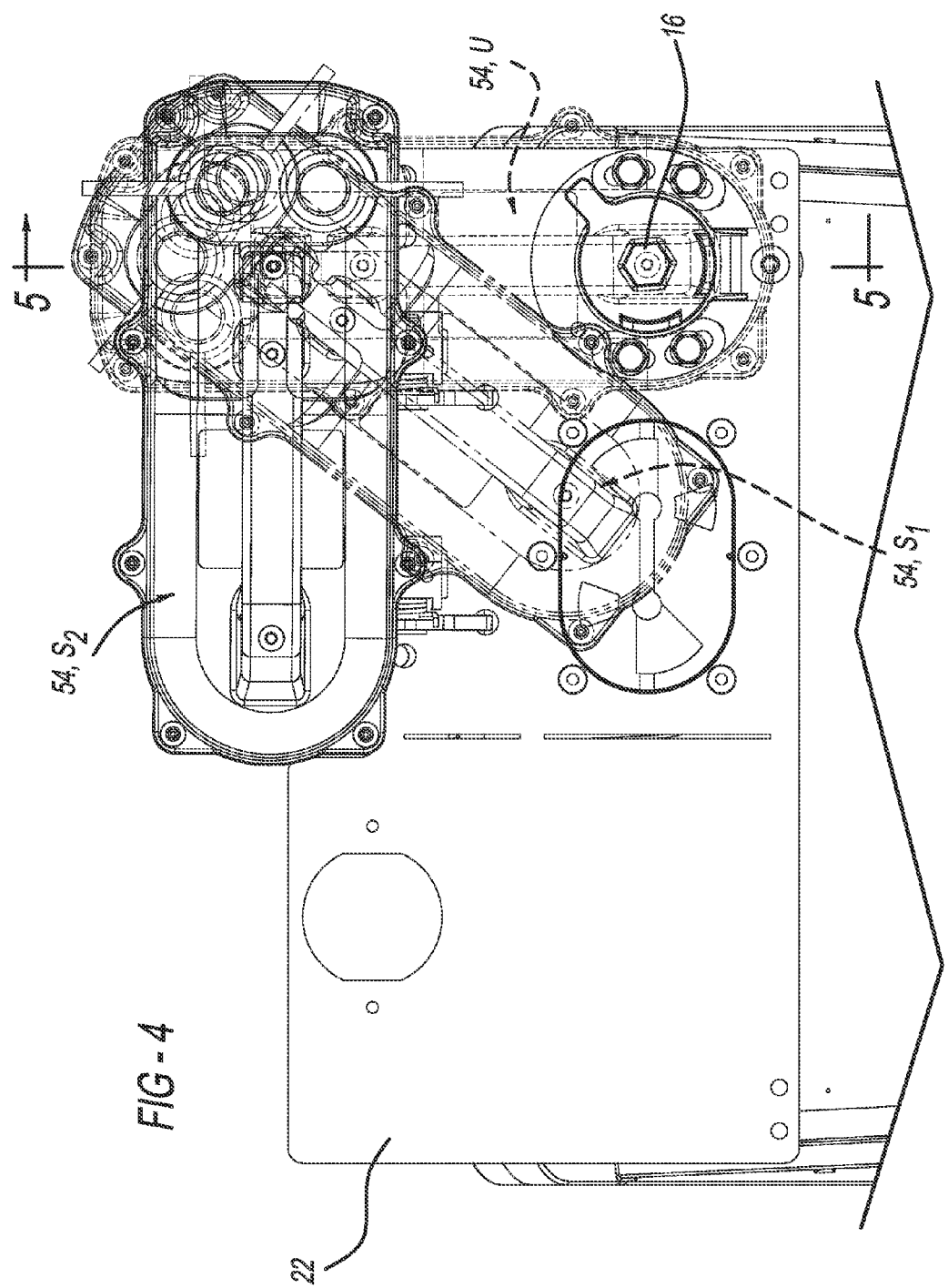
FIG. 4 is a front elevation showing the motor operator in a first stowed position, a second stowed position and a use position.
Figure 5:
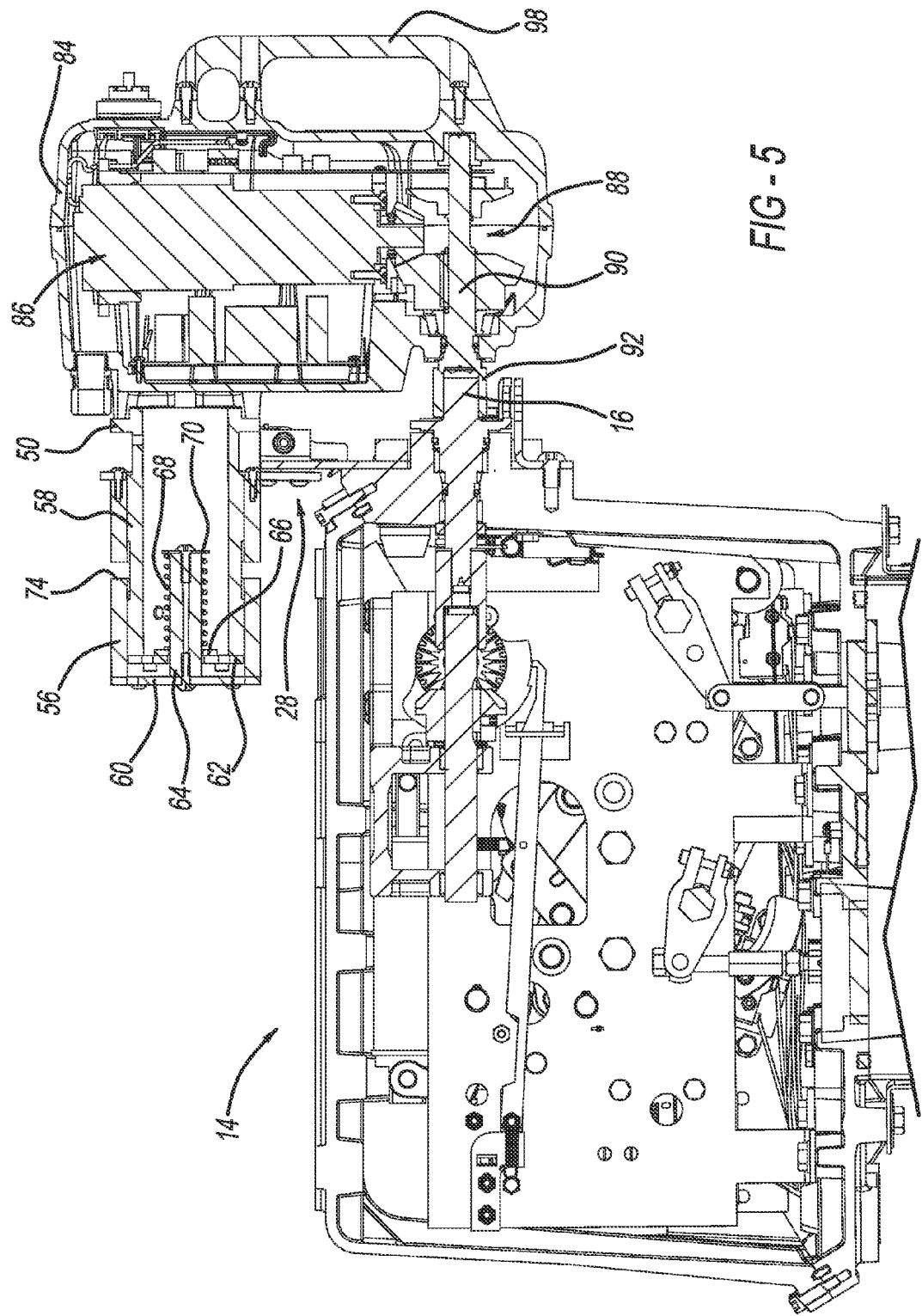
FIG. 5 is a cross-section of the motor operator and a portion of the switchgear operating mechanism.

With continued reference to FIGS. 1, 2 and 4, a motor operator assembly 20, which is shown uncoupled from the switchgear unit 10 in FIG. 1, can be releasably secured to a faceplate 22 as best seen in FIG. 2, and selectively positioned from a stowed position to a use position for selectively coupling the motor operator 54 to the input drive shaft 16 as best seen in FIG. 4.

Figure 3:
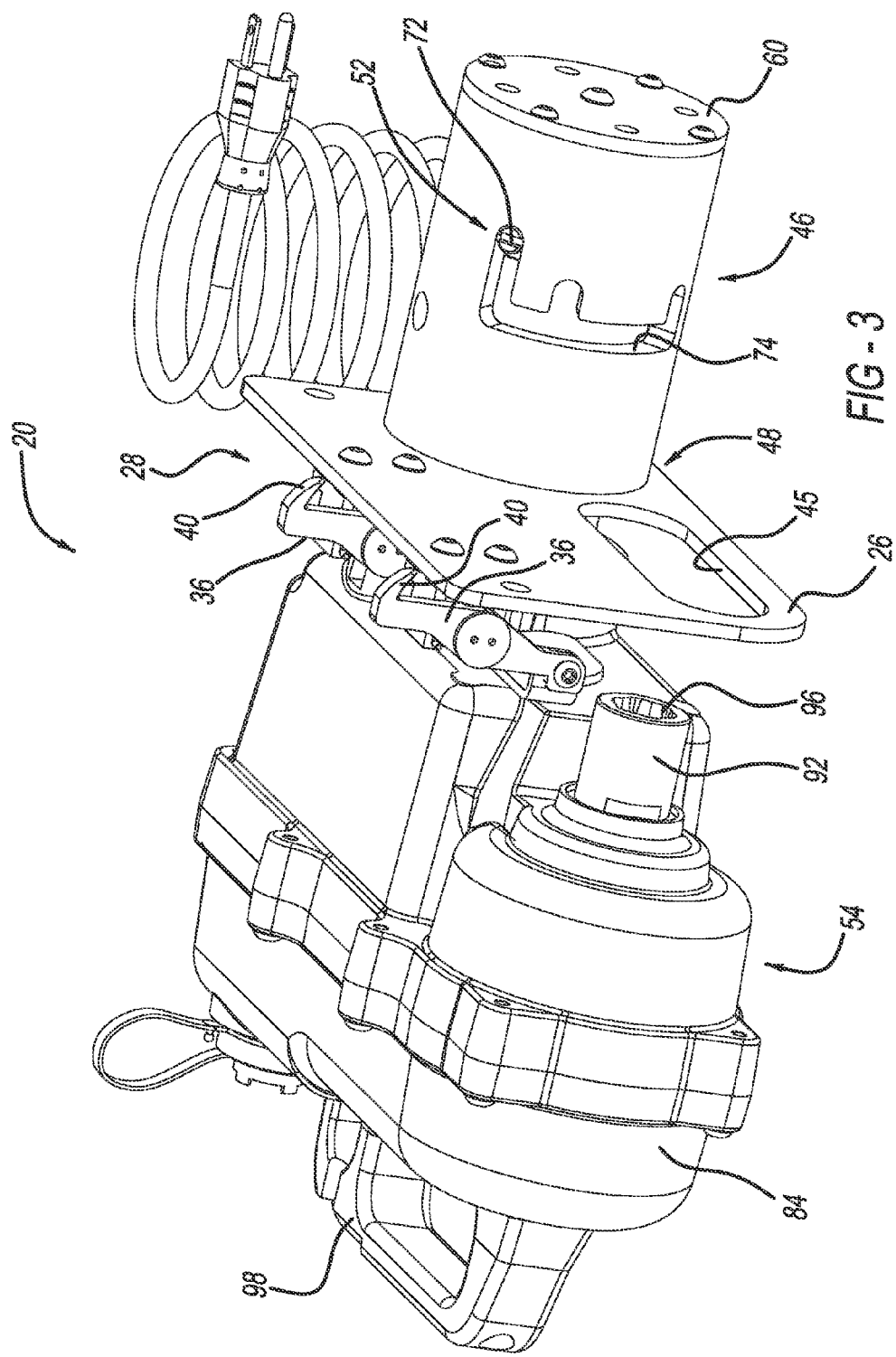
FIG. 3 is a perspective view of a motor operator with a coupling mechanism.
Figure 6:
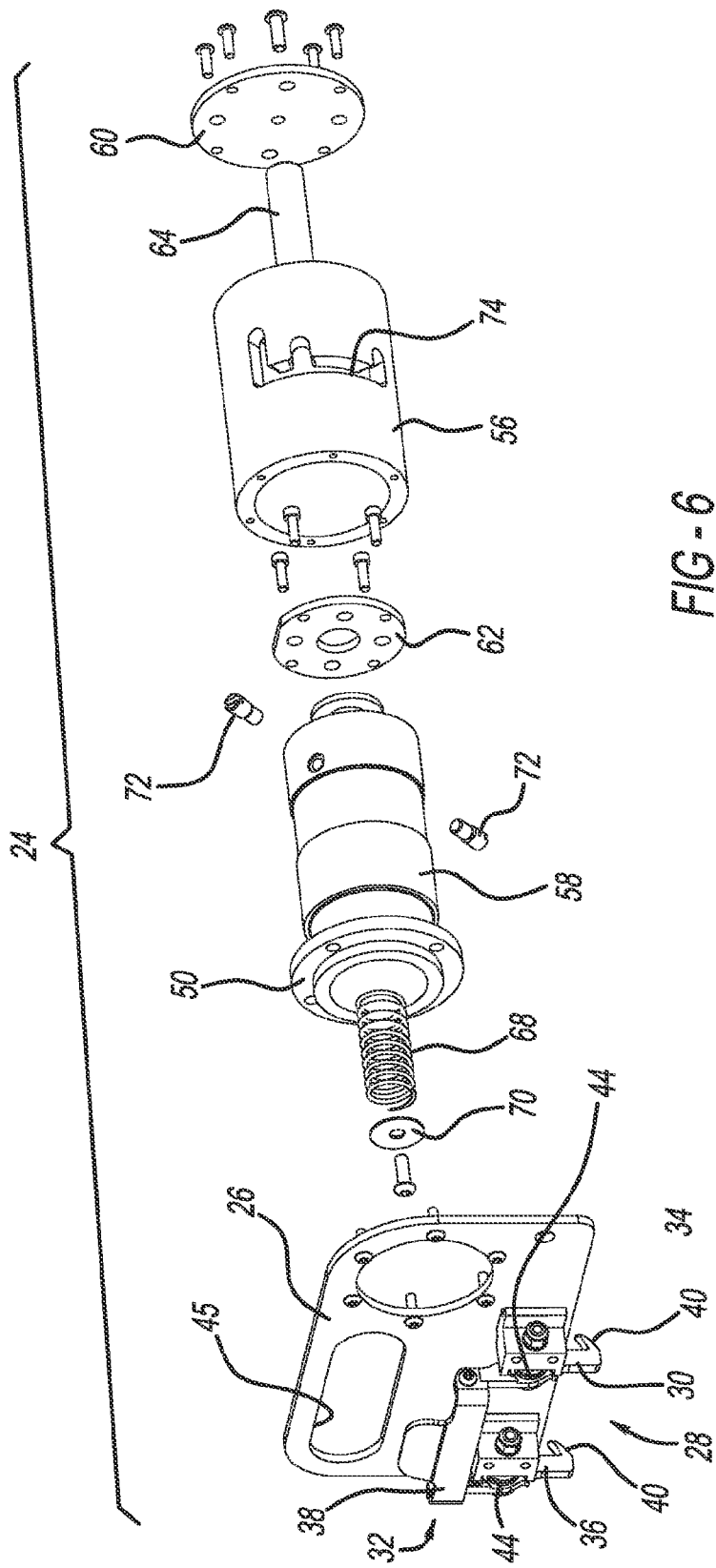
FIG. 6 is an expanded view of the coupling mechanism.
Figure 7:
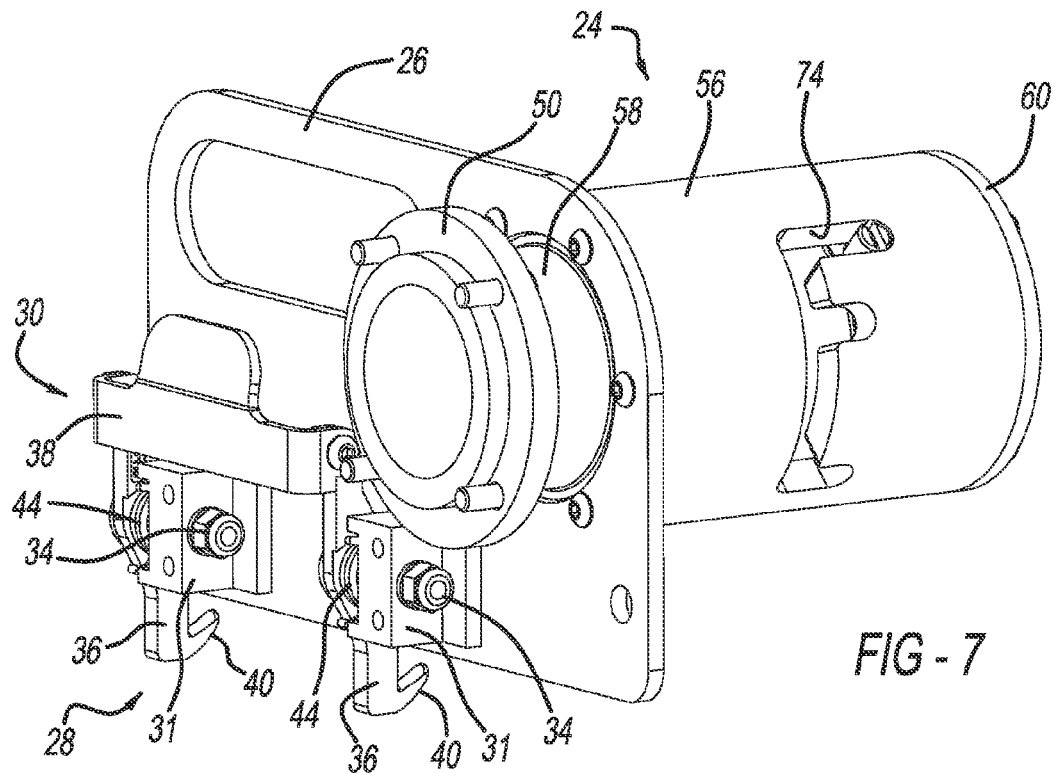
FIG. 7 is a perspective view of the coupling mechanism illustrated in FIGS. 6.

With continued reference to FIGS. 3 and 6-7, the motor operator assembly 20 includes a coupling mechanism 24 having a support plate 26 and a latch mechanism 28 secured to the support plate 26. The latch mechanism 28 has a latch member 30 configured to releasably secure the support plate 26 to the faceplate 22. The latch mechanism 28 further includes a pair of pivot supports 31 extending from the support plate 26. A latch handle 32 is pivotally coupled to the pivot supports 31 with a pivot bolt 34. The latch handle 32 has a pair of arms 36 extending from a handle body 38. A catch 40 is disposed at the end of each arm 36 and is configured to be received in a pair of holes 42 formed in the faceplate 22. The latch handle 32 is pivotally positionable between an engaged position and a released position. A latch spring 44 is operably coupled between the latch handle 32 and the support plate 26, and more specifically the pivot supports 31 for biasing the latch handle 32 towards the engaged position. The support plate 26 has an elliptical hole 45 formed there through to provide a handhold for the motor operator assembly 20.

A guide tube 46 is secured to the support plate 26. The guide tube 46 includes a cylinder assembly 48 having a motor mount 50 and an indexing mechanism 52 for selectively positioning the cylinder assembly 48 between a stowed position and a use position. A motor operator 54 is attached to the motor mount 50. The cylinder assembly 48 includes an outer housing 56 secured to the support plate 26 and a rotating cylinder 58 supported for relative reciprocating motion and relative rotational motion within the outer housing 56. The cylinder assembly 48 further includes a first end plate 60 secured to an end of outer housing 56 opposite the support plate 26 and a second end plate 62 secured to an end of the rotating cylinder 58 opposite the motor mount 50. A tension rod 64 extends from the first end plate 60 through a hole 66 formed in the second end plate 62. A compression spring 68 is coupled to an end of the tension rod 64 with a retainer 70. The compression spring 68 biases the rotating cylinder 58 into the outer housing 56.

The indexing mechanism 52 includes a follower 72 extending radially from the rotating cylinder 58 through a guide slot 74 formed in the outer housing 56 of the cylinder assembly 48. With the follower 72 in the guide slot 74, movement of rotating cylinder 58 relative to the outer housing 56 is constrained. The guide slot 74 has a longitudinal leg 76 corresponding to a use position U of the motor operator 54, longitudinal leg 78 corresponding to a first stowed position $S_1$ of the motor operator 54, and a longitudinal leg 80 disposed corresponding to a second stowed position $S_2$. A circumferential leg 82 interconnects the longitudinal legs 76, 78, 80. As best seen in FIGS. 8A-8D, the longitudinal leg 76 associated with the use position is longer that the longitudinal legs 78, 80 associated with the stowed positions. This ensures that the motor operator 54 will not interfere with the support plate 26 or the faceplate 22 when in the stowed states.

The motor operator 54 includes motor housing 84 secured to the motor mount 50 and encasing an electric motor 86, a drive train 88 coupled to an output shaft of the motor 86. The drive train 88 terminates at an operator shaft 90 having a socket 92 formed thereon. The motor 86 rotatably drives the operating shaft 90 and socket 92. As presently preferred, the input drive shaft 16 of the switchgear unit 10 has a hex-shaped head 94. To allow for easy alignment and coupling of the operating shaft 90 to the hex-shaped head 94, the socket 92 has a spiral tapered lead-in angle 96 as seen in FIG. 3. This lead-in angle 96 allows for the two shafts (input drive shaft 16 and operating shaft 90) to be up to 10° out of alignment in either direction and still be connected together. Once the operator shaft 90 is inserted onto the input drive shaft 16, the lead-in angle 96 causes the two shafts to become properly aligned. The motor housing 84 has a handle 98 formed thereon for selectively positioning the motor operator 54 between the first and second stowed positions and the use position. The handle 98 is configured so that the motor operator 54 may be positioned using one hand (fitted with electrical gloves) or from a distance with the use of a "shotgun" tool.

With reference now to FIGS. 1-3, the coupling/decoupling of the switchgear motor operator 54, and in particular the coupling mechanism 24 to the faceplate 22 is described. Initially, the switchgear motor operator 20 must be attached to the switchgear unit 10. The latch mechanism 28 is pivoted against the spring bias from the engaged position to the released position. The support plate 26 is then located adjacent the faceplate 22 and the pivot supports 31 are moved into slots 100 formed in the faceplate 22. Next, the latch mechanism 28 is pivoted from the released position to the engaged position causing the catches 40 to be inserted into the holes 42 formed in the faceplate 22. The latch mechanism 28 is now positively engaged with and coupled to the faceplate 22 with sufficient rigidity to counteract the torque applied but the motor operator 54 into the input drive shaft 16 to open and close the switches in the switchgear unit 10.

Figure 8A:
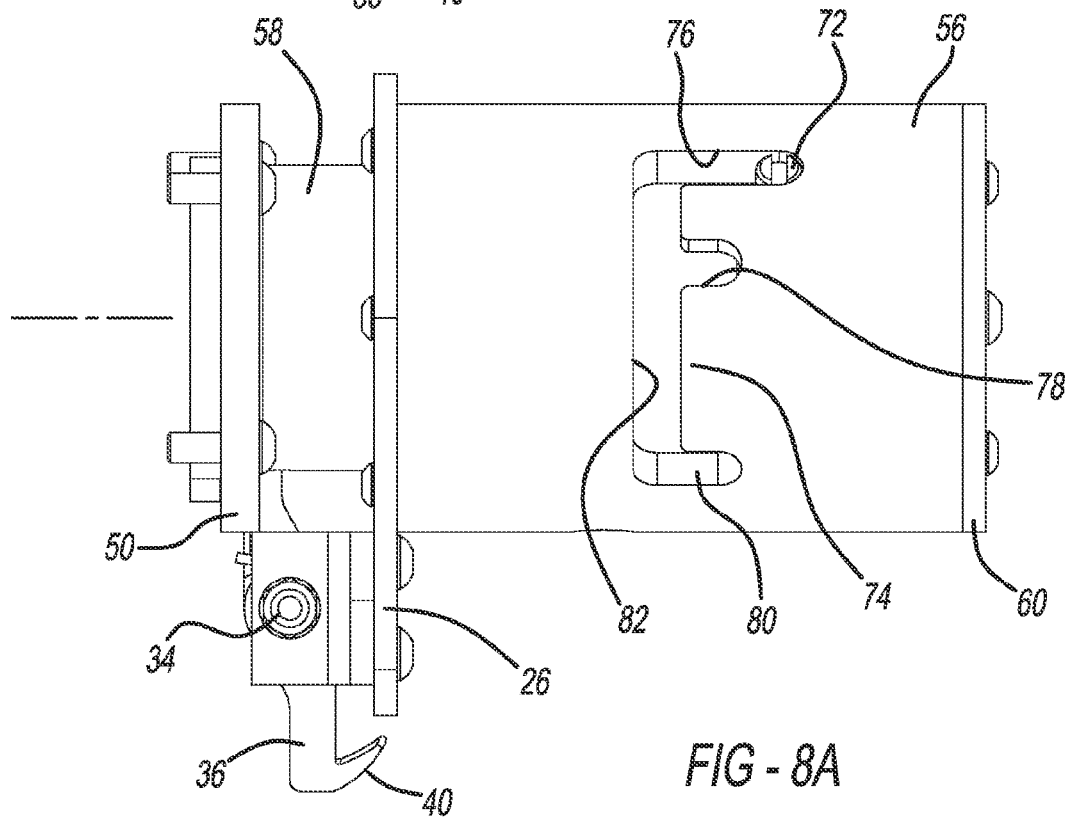
FIGS. 8A-8D illustrate relative positioning of the coupling mechanism from the first stowed position through the second stowed position to the use position.

With reference now to FIGS. 4 and 8A-8D, positioning of the motor operator 54 between the use position U and the first and second stowed positions $S_1$, $S_2$ will now be described. As shown in FIG. 4, the motor operator 54 is located in a use position U, whereby the motor operator 54 is positioned vertically and the socket 92 engages the input drive shaft 16. In this position, the follower 72 is located at the end of the longitudinal leg 76 as shown in FIG. 8A.

Figure 8B:
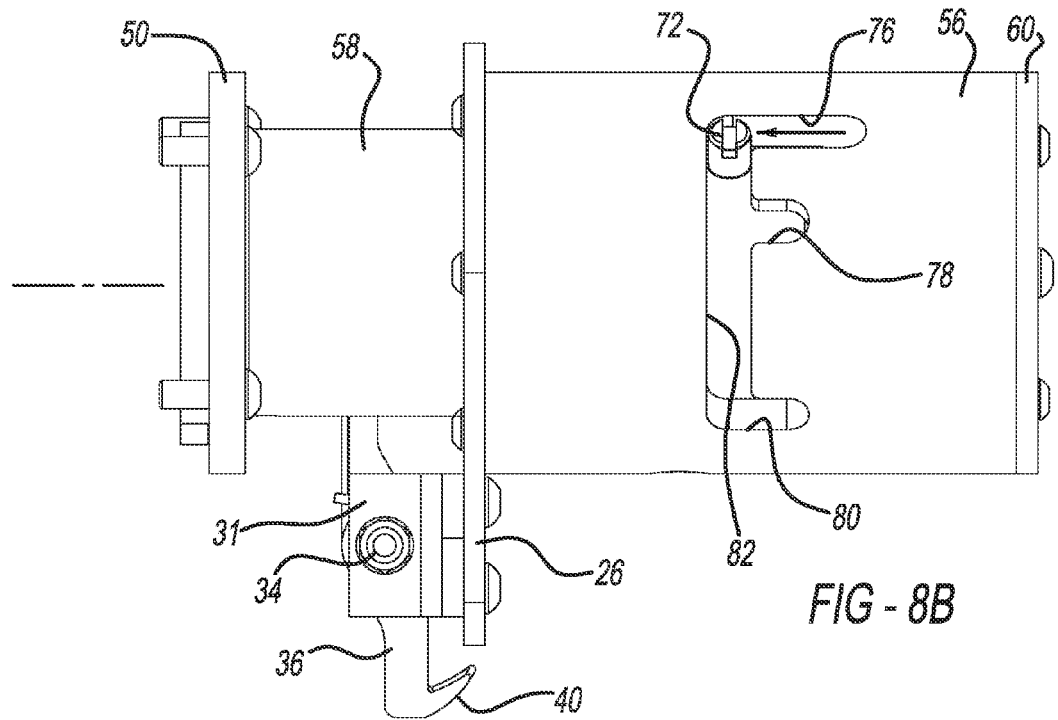
Figure 8C:
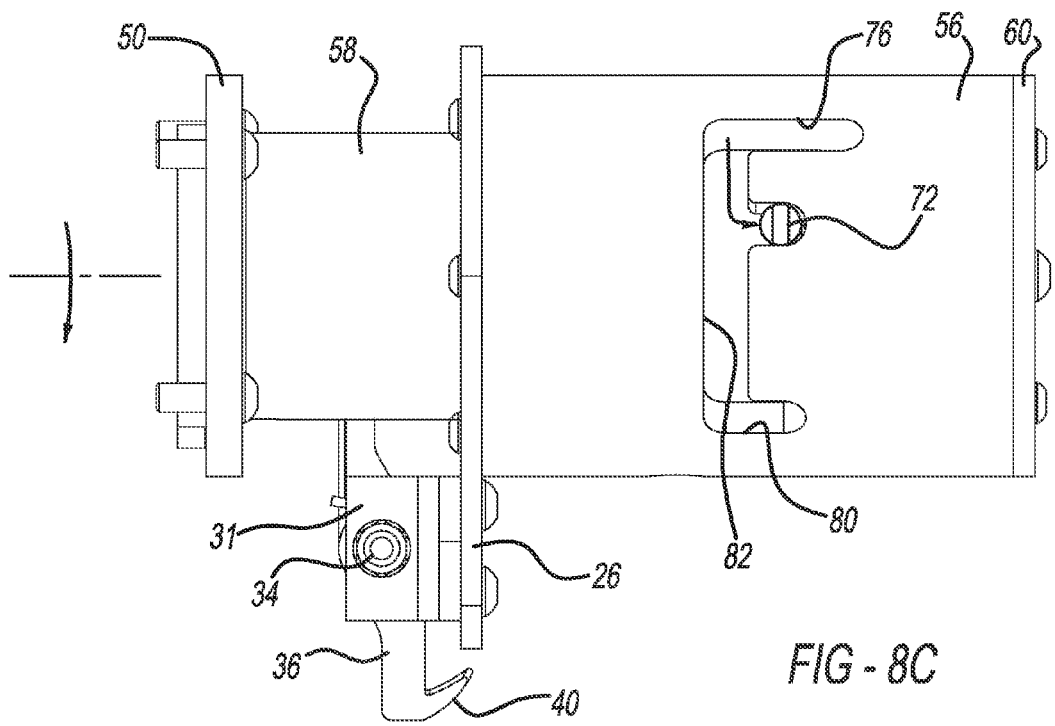

To relocate the motor operator 54 to a first or partially stowed position $S_1$, the motor operator 54 is pulled away from the switchgear unit 10 in the direction of the arrow, which causes the follower 72 to traverse the longitudinal leg 76 as shown in FIG. 8B. This motion caused the rotating cylinder 58 to slide within the outer housing 56 against the bias of the compression spring 68. Once the follower 72 reaches the circumferential leg 82, the motor operator 54 may be rotated in a clockwise direction as shown by the arrow in FIG. 8C until it reaches the longitudinal leg 78. In this position, the motor operator 54 may be released such that the follower 72 traverses the longitudinal leg 78 in response to the bias of the compression spring 68. The motor operator 54 is now positioned in a partially stowed position $S_1$ (see FIG. 4), whereby the motor operator 54 is positioned about 30° off vertical and the socket 92 is held away from the faceplate 22 and the support plate 26.

Figure 8D:
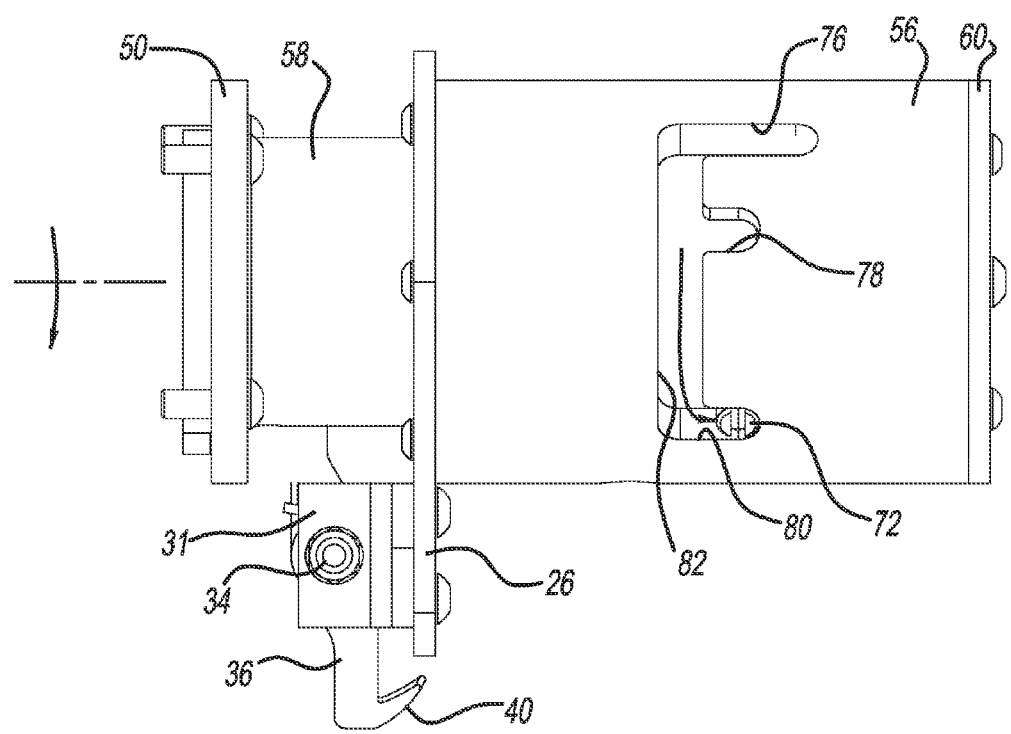

To further relocate the motor operator 54 to a second or fully stowed position $S_2$, the motor operator 54 is again pulled away from the switchgear unit 10 which caused the follower 72 to traverse the longitudinal leg 78 as shown in FIG. 8D until it aligns with the circumferential leg 82. This motion caused the rotating cylinder 58 to slide within the outer housing 56 against the bias of the compression spring 68. Once the follower 72 reaches the circumferential leg 82, the motor operator 54 may be rotated in a clockwise direction as shown by the arrow in FIG. 8D until it reaches the longitudinal leg 80. In this position, the motor operator 54 may be released such that the follower 72 traverses the longitudinal leg 80 in response to the bias of the compression spring 68. The motor operator 54 is now positioned in a fully stowed position $S_2$ (see FIG. 4), whereby the motor operator 54 is positioned about 90° off vertical and the socket 92 is held away from the faceplate 22 and the support plate 26.

In each of the stowed positions $S_1$ and $S_2$, the motor operator 54 can be operated independently without affecting the switchgear, and the switchgear may be manually operated without affecting the motor operator 54.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A coupling mechanism for releasably securing and selectively coupling a motor operator to a switchgear unit, the coupling mechanism comprising:
    a support plate;
    a latch mechanism secured to the support plate and having a latch member configured to releasably secure the support plate to a switchgear unit; and
    a guide tube secured to the support plate, the guide tube including a cylinder assembly configured to support a motor operator and an indexing mechanism to selectively position the cylinder assembly between a stowed position and a use position.

2. The coupling mechanism of claim 1 wherein the latch mechanism comprises a pivot support extending from the support plate, a latch handle pivotally coupled to the pivot support and a catch extending from the latch handle and configured to engage a faceplate on a switchgear unit, wherein the latch handle is positionable between an engaged position and a released position.

3. The coupling mechanism of claim 2 wherein the latch handle comprises a pair of arms extending from a latch body, each arm having a catch formed on an end thereof opposite the latch body.

4. The coupling mechanism of claim 2 wherein the latch mechanism further comprises a latch spring interposed between the pivot support and the latch handle for biasing the latch handle towards the engaged position.

5. The coupling mechanism of claim 2 wherein the pivot support is configured to positively engage the faceplate.

6. The coupling mechanism of claim 1 wherein the cylinder assembly of the guide tube comprises an outer housing secured to the support plate and a rotating cylinder supported within the outer housing for relative reciprocating motion and rotational motion therein, the rotating cylinder having a motor mount for attaching the motor operator.

7. The coupling mechanism of claim 6 wherein the cylinder assembly further comprises a first end plate secured to an end of outer housing opposite the support plate, a second end plate secured to an end of the rotating cylinder opposite the motor mount, a tension rod extending from the first end plate through a hole in the second end plate, and a spring element coupled to the tension rod for biasing the rotating cylinder into the outer housing.

8. The coupling mechanism of claim 6 wherein the indexing mechanism comprises a follower extending radially from the rotating cylinder of the cylinder assembly through a guide slot formed in the outer housing of the cylinder assembly, wherein the guide slot has a first longitudinal leg corresponding to the use position, a second longitudinal leg corresponding to a fully stowed position and a circumferential leg interconnecting the first and second longitudinal legs.

9. The coupling mechanism of claim 8 wherein the guide slot further comprises a third longitudinal leg disposed between the first and second longitudinal leg and connected to the circumferential leg, the third longitudinal leg corresponding to a partially stowed position between the fully stowed position and the use position.

10. The coupling mechanism of claim 1 wherein the support plate has a handhold formed therein.

11. A motor operator assembly in combination with a switchgear unit comprising:
    a switchgear unit having a faceplate, an input drive shaft extending from the faceplate, and an operating mechanism coupled to input drive shaft and configured for circuit making and circuit breaking in the switchgear unit;
    a motor operator assembly including:
    a support plate;
    a latch mechanism secured to the support plate and having a latch member configured to releasably secure the support plate to a switchgear unit;
    a guide tube secured to the support plate, the guide tube including a cylinder assembly having a motor mount and an indexing mechanism to selectively position the cylinder assembly between a stowed position and a use position; and
    a motor operator attached to the motor mount.

12. The combination of claim 11 wherein the latch mechanism comprises a pivot support extending from the support plate, a latch handle pivotally coupled to the pivot support and a catch extending from the latch handle and configured to engage a faceplate on a switchgear unit, wherein the latch handle is positionable between an engaged position and a released position.

13. The combination of claim 12 wherein the latch handle comprises a pair of arms extending from a latch body, each arm having a catch formed on an end thereof opposite the latch body.

14. The combination of claim 12 wherein the latch mechanism further comprises a latch spring interposed between the pivot support and the latch handle for biasing the latch handle towards the engaged position.

15. The combination of claim 12 wherein the faceplate has a slot formed therein, and the pivot support is received within the slot and positively engages the faceplate.

16. The combination of claim 11 wherein the cylinder assembly of the guide tube comprises an outer housing secured to the support plate and a rotating cylinder supported within the outer housing for relative reciprocating motion and relative rotational motion therein, wherein the motor mount is disposed on an end of the rotating cylinder.

17. The combination of claim 16 wherein the cylinder assembly further comprises a first end plate secured to an end of outer housing opposite the support plate, a second end plate secured to an end of the rotating cylinder opposite the motor mount, a tension rod extending from the first end plate through a hole in the second end plate, and a spring element coupled to an end of the tension rod for biasing the rotating cylinder into the outer housing.

18. The combination of claim 16 wherein the indexing mechanism comprises a follower extending radially from the rotating cylinder of the cylinder assembly to extend through a guide slot formed in the outer housing of the cylinder assembly, wherein the guide slot has a first longitudinal leg corresponding to a use position, a second longitudinal corresponding to a fully stowed position, and a
circumferential leg interconnecting the first and second longitudinal legs.

19. The combination of claim 18 wherein the guide slot further comprises a third longitudinal leg disposed between the first and second longitudinal leg and connected to the circumferential leg, the third longitudinal leg corresponding to a partially stowed position between the fully stowed position and the use position.

20. The combination of claim 11 wherein the support plate has a handhold formed therein.

\* \* \* \* \*